(12) United States Patent
Feenstra et al.

(10) Patent No.: US 9,548,018 B2
(45) Date of Patent: *Jan. 17, 2017

(54) DISPLAY DEVICE HAVING AN ELECTRODE PARTIALLY COVERING A PICTURE ELEMENT

(71) Applicant: Amazon Technologies, Inc., Reno, NV (US)

(72) Inventors: Bokke Johannes Feenstra, Eindhoven (NL); Robert Andrew Hayes, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,638

(22) Filed: Oct. 10, 2012

(65) Prior Publication Data

US 2013/0076602 A1 Mar. 28, 2013

Related U.S. Application Data

(60) Division of application No. 13/229,343, filed on Sep. 9, 2011, now abandoned, which is a continuation of application No. 10/557,377, filed as application No. PCT/IB2004/050697 on May 14, 2004, now Pat. No. 8,031,168.

(30) Foreign Application Priority Data

May 22, 2003 (EP) .................................. 03101473

(51) Int. Cl.
G09G 3/28 (2013.01)
G02B 26/00 (2006.01)

(52) U.S. Cl.
CPC ............... *G09G 3/28* (2013.01); *G02B 26/004* (2013.01)

(58) Field of Classification Search
CPC ................................. G02B 26/004; G09G 3/28
USPC ............................................................ 345/84
See application file for complete search history.

(56) References Cited

U.S. PATENT DOCUMENTS

| | | |
|---|---|---|
| 4,079,368 A | 3/1978 | DiStefano |
| 5,659,330 A | 8/1997 | Sheridon |
| 5,757,345 A | 5/1998 | Sheridon |
| 5,956,005 A | 9/1999 | Sheridon |

(Continued)

FOREIGN PATENT DOCUMENTS

| | | |
|---|---|---|
| EP | 0783122 | 9/1997 |
| EP | 0806753 | 8/2011 |
| JP | 2000-356750 | 12/2000 |

OTHER PUBLICATIONS

International Search Report of PCT/IB2004/050697 dated on Sep. 8, 2004.

(Continued)

*Primary Examiner* — Kumar Patel
*Assistant Examiner* — Insa Sadio
(74) *Attorney, Agent, or Firm* — Lee & Hayes, PLLC

(57) ABSTRACT

An optical switch, e.g. a display cell based on layer displacement or layer break up having at least two different states, in which one of the fluids e.g. oil in a first state adjoins at least a first support plate and in the second state the other fluid at least partly adjoins the first support plate. Part of an otherwise homogeneous electrode is removed to realize oil motion control.

14 Claims, 2 Drawing Sheets

(56) References Cited

U.S. PATENT DOCUMENTS

| | | |
|---|---|---|
| 6,449,081 B1 | 9/2002 | Onuki et al. |
| 6,603,444 B1 | 8/2003 | Kawanami et al. |
| 7,147,763 B2 | 12/2006 | Elrod et al. |
| 7,420,549 B2 | 9/2008 | Jacobson et al. |
| 2003/0012483 A1* | 1/2003 | Ticknor et al. ........ 385/16 |
| 2003/0021521 A1 | 1/2003 | Hayashi et al. |
| 2004/0263947 A1 | 12/2004 | Drzaic et al. |

OTHER PUBLICATIONS

Non-Final Office Action of U.S. Appl. No. 10/557,377 issued on May 13, 2008.
Final Office Action of U.S. Appl. No. 10/557,377 issued on Dec. 15, 2008.
Non-Final Office Action of U.S. Appl. No. 10/557,377 issued on May 26, 2009.
Non-Final Office Action of U.S. Appl. No. 10/557,377 issued on Nov. 30, 2009.
Final Office Action of US Patent Application No. 10/557,377 issued on May 24, 2010.
Notice of Allowance of U.S. Appl. No. 10/557,377 issued on Jun. 1, 2011.
Non-Final Office Action of U.S. Appl. No. 13/229,343 issued on Dec. 12, 2011.
Final Office Action of U.S. Appl. No. 13/229,343 issued on Jun. 11, 2012.

\* cited by examiner

DISPLAY DEVICE HAVING AN ELECTRODE PARTIALLY COVERING A PICTURE ELEMENT

CROSS REFERENCE RELATED APPLICATIONS

This application is a divisional of U.S. patent application Ser. No. 13/229,343, filed on Sep. 9, 2011, which is a continuation of U.S. patent application Ser. No. 10/557,377, filed on Nov. 18, 2005, now issued as U.S. Pat. No. 8,031,168, which is the National Stage Entry of International Application No. PCT/IB2004/050697, filed May 14, 2004, and claims the benefit of and priority from European Patent Application No. 03101473.1, filed May 22, 2003, which are all hereby incorporated by reference for all purpose as if fully set forth herein.

BACKGROUND

Field

The invention relates to an optical switch having at least one first fluid and a second fluid immiscible with each other within a space between a first transparent support plate and a second support plate, the second fluid being electroconductive or polar. In particular the invention relates to a display device comprising picture elements having at least one first fluid and a second fluid immiscible with each other within a space between a first transparent support plate and a second support plate, the second fluid being electroconductive or polar.

Optical switches may be used in shutter applications, diaphragms, but also in switchable color filters in e.g. display applications.

Display devices like TFT-LCDs are used in laptop computers and in organizers, but also find an increasingly wider application in GSM telephones. Instead of LCDs, for example, (polymer) LED display devices are also being used.

Apart from these display effects which are well established by now other display techniques are evolving like electrophoretic displays, which are suitable for paper white applications.

The invention is based on a principle called electrowetting. The invention provides new ways of using this principle.

If for instance a (first) fluid is a (colored) oil and the second (the other) fluid is water (due to interfacial tensions) a two layer system is provided which comprises a water layer and an oil layer. However, if a voltage is applied between the water and an electrode on the first support plate the oil layer moves aside or breaks up due to electrostatic forces. Since parts of the water now penetrate the oil layer the picture element becomes partly transparent.

If homogeneous (Indium Tin Oxide) electrodes are used to address the picture elements, since this is the simplest way, the electric field is applied across the entire picture element. Hence, in principle, there is no preferred direction for the (first) fluid (the oil) to move to. However, in practice there will always be a (small) inhomogeneity inside the picture element (insulator or oil thickness variation, slight irregularity in a pixel wall, etcetera) that will determine which way the (first) fluid (the oil) will move. As a result always the same motion occurs upon voltage application. However, the motion will vary from pixel to pixel. For several reasons, including grey-scale homogeneity and reducing the chance of oil mixing between adjacent pixels, the oil motion should be better controlled.

To this end a display device according to the invention comprises within each picture element a first electrode only partly covering the total area of the picture element. Preferably the first electrode at least leaves clear a part of the picture element along an edge of the picture element.

When a voltage is applied, there will be an electric field at the places where the electrode is present. Effectively this region will become more wettable for the second fluid (more hydrophilic in an oil-water system). On the other hand, at places where no electrode is present there will be no electric field, and thus this region will be less wettable for the second fluid (more hydrophobic). As a result, the oil will tend to move toward the least wettable region.

In a particular embodiment a display device according to the invention comprises at least one further electrode at the remaining area of the picture element. If driving means are present to apply voltages to the first and further electrodes the oil motion can be enhanced.

These and other aspects of the invention are apparent from and will be elucidated with reference to the embodiments described hereinafter.

BRIEF DESCRIPTION OF THE DRAWINGS

The Figures are diagrammatic and not drawn to scale. Corresponding elements are generally denoted by the same reference numerals.

DETAILED DESCRIPTION OF THE ILLUSTRATED EMBODIMENTS

Figures 1A, 1B:
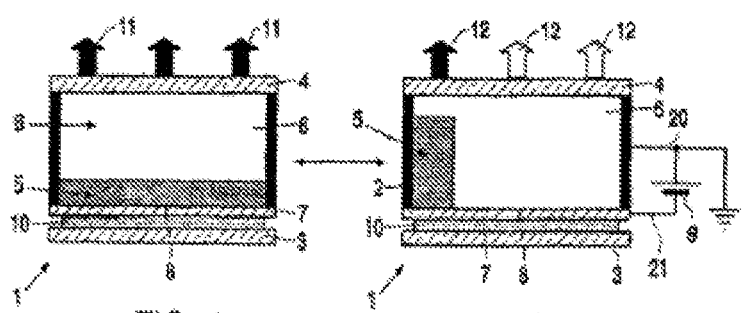
FIGS. 1A and 1B are diagrammatic cross-sectional views of a part of a display device according to the invention.

FIGS. 1A and 1B are diagrammatic cross-sectional views of a part of a display device 1 according to the invention. Between two transparent substrates or support plates 3, 4 a first fluid 5 and a second fluid 6 are provided, which are immiscible with each other. The first fluid 5 is for instance an alkane like tetradecane or hexadecane or as in this example, an (silicone) oil. The second fluid 6 is electroconductive or polar, for instance water or a salt solution (e.g. a solution of KCl in a mixture of water and ethyl alcohol).

In a first state, when no external voltage is applied (FIG. 1A) the fluids 5, 6 adjoin the first and second transparent support plates 3, 4 of e.g. glass or plastic. On the first support plate 3 a (transparent) electrode 7, for example indium (tin) oxide is provided and an intermediate less wettable (hydrophobic) layer 8, in this example an amorphous fluoropolymer (AF1600).

When a voltage is applied (voltage source 9) via interconnections 20, 21 the layer 5 moves aside or breaks up into small droplets (FIG. 1B, fragmented film). This occurs when the electrostatic energy gain is larger than the surface energy loss due to the creation of curved surfaces. As a very important aspect it was found that reversible switching between a continuous film 5 covering the support plate 3 and a film adjoining the wall 2 is achieved by means of the electrical switching means (voltage source 9).

Figures 2A, 2B:
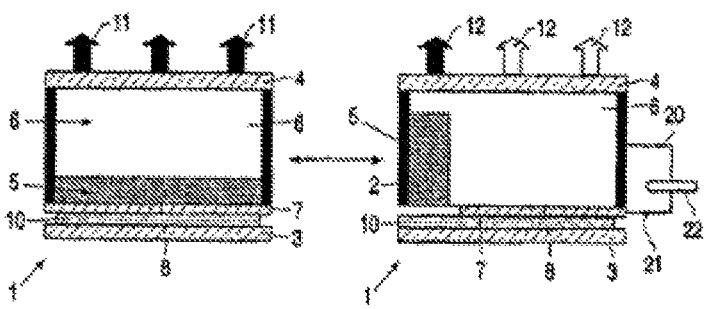
FIGS. 2A and 2B are diagrammatic cross-sectional views of a part of a display device according to the invention.
Figure 3:
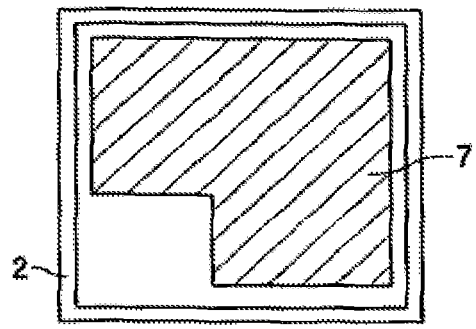
FIGS. 3 and 4 are plan views of a part of a display device according to the invention.

FIGS. 2A and 2B illustrate an embodiment of a display device according to the invention, in which part of the electrode 7 has been left away (see also FIG. 3). When a voltage is applied, there will be an electric field at the places where the electrode (ITO) is present. In this region the coating will become more wettable for the second fluid. On the other hand, at the lower left hand corner (FIG. 3) where there is no electrode (ITO) present there will be no electric field, and thus the coating will remain less wettable. As a result, the oil will tend to move toward the least wettable region: the lower left hand corner. As a result, always the same motion towards especially designed corners of display cells occurs upon voltage application.

Voltages are applied by means of a driving unit 22. The size of the area of ITO that is removed should be chosen properly. When a large area is chosen, the remnant oil area will consequently be rather large, thereby reducing the brightness of the display. On the other hand, when the chosen area becomes too small, the oil motion will no longer have a preference to move into this corner. Preferably at least a part along the edge of the picture element comprising 5% of the total area of the picture element is kept clear, while at most a part along the edge of the picture element comprising 50% (preferably 10%) of the total area of the picture element is kept clear.

In a matrix driven display device a matrix of switching elements e. g. thin film transistors (TFT) may be chosen for applying the driving signals. The thin film transistors preferably are located at the areas where no electrodes 7 are present. If necessary this area (and also inter-pixel areas) may be covered by a black matrix to enhance contrast.

Figure 4:
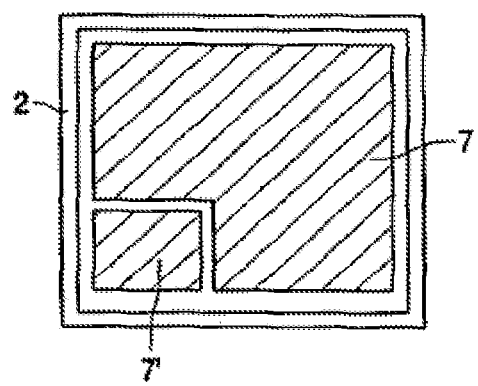
Figure 5:
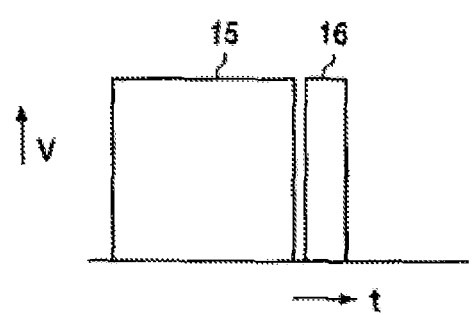
FIG. 5 shows driving voltages.

FIG. 4 shows another embodiment in which a corner of the picture element has been provide with a further electrode 7'. Voltage pulses (see FIG. 5) are provided to electrodes 7, 7' to accelerate the retraction of the oil film. First, a voltage pulse 15 is applied to electrode 7 to remove the oil from most of the active area Electrode 7' is grounded and as a result, the oil will move into the corresponding corner of the picture element. After the voltage on electrode 7 has been removed, a short voltage pulse 16 is applied to electrode 7'. As a result, the oil is removed from electrode 7' and redistributed over the rest of the picture element. When the voltage on electrode 7' is removed, the oil will also spread over this part of the picture element.

The electrode configuration chosen here is merely an example. Other electrode configurations can be chosen, such as a circular geometry. Such a circular geometry is used in e.g. shutter applications and diaphragms.

The electrode on which the oil is collected should be as small as possible compared to the total size, while still being sufficiently large to determine the direction of motion.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:
1. A display device comprising:
a first support plate;
an opposing second support plate; and
picture elements disposed between the first and second support plates, each picture element comprising:
a wall enclosing first and second regions of a surface of the first support plate, the first and second regions being non-overlapping;
a first fluid and a second fluid immiscible with each other disposed within a space between the first support plate, the second support plate, and the wall, the second fluid being electroconductive or polar, and the first fluid being confined within the wall; and
a first electrode arranged on the first support plate in the first region only and configured to apply an electrowetting effect, such that the first fluid forms a continuous film covering the first region and the second region when no voltage is applied to the first electrode, and the first fluid moves toward the second region on application of a voltage to the first electrode.

2. A display device according to claim 1, wherein the second region is arranged along an edge of the picture element, the edge of the picture element being an outer edge of the surface area of the picture element enclosed within the wall.

3. A display device according to claim 2, wherein the second region is arranged along one of the corners of a substantially rectangular picture element.

4. A display device according to claim 2, wherein the second region along the edge of the picture element comprises 5% of the total area of the picture element.

5. A display device according to claim 2, wherein the second region along the edge of the picture element comprises 50% of the total area of the picture element.

6. A display device according to claim 2, wherein the second region along the edge of the picture element comprises 10% of the total area of the picture element.

7. A display device according to claim 1, further comprising at least one second electrode arranged in the second region.

8. A display device according to claim 7, further comprising a driving unit to apply voltages to the first electrode and the second electrode.

9. A display device according to claim 8, wherein the driving unit is configured to provide to the first electrode a first pulse having a first pulse width while the second electrode is grounded and, after removal of the first pulse, to provide to the second electrode a second pulse having a second pulse width, wherein the second pulse width is smaller than the first pulse width.

10. A display device according to claim 1, further comprising a power source to provide power to the picture element.

11. A display device according to claim 10, wherein the power source is a voltage source.

12. A display device according to claim 1, further comprising switching devices located at a part of the picture element left clear by the first electrode.

13. A display device according to claim 12, wherein the part of the picture element left clear by the first electrode is covered by a black mask.

14. A display device according to claim 1, wherein the second region includes no electrode.

* * * * *